Oct. 23, 1934.    N. E. JERSEY ET AL    1,977,764
TRACTION TREAD
Filed April 14, 1933    2 Sheets-Sheet 1
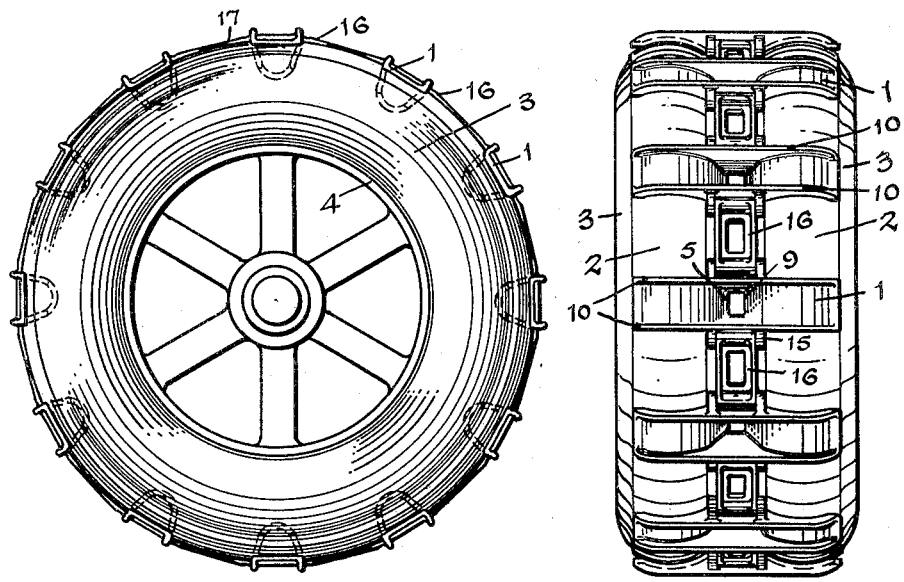
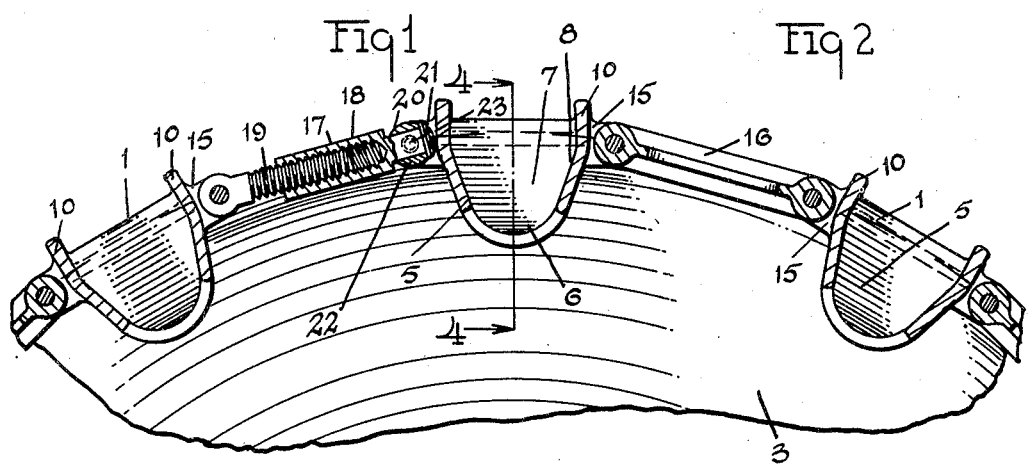
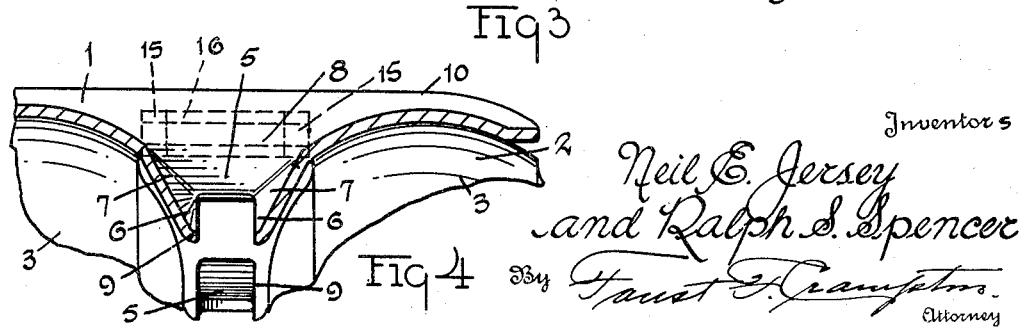

Oct. 23, 1934.  N. E. JERSEY ET AL  1,977,764
TRACTION TREAD
Filed April 14, 1933   2 Sheets-Sheet 2
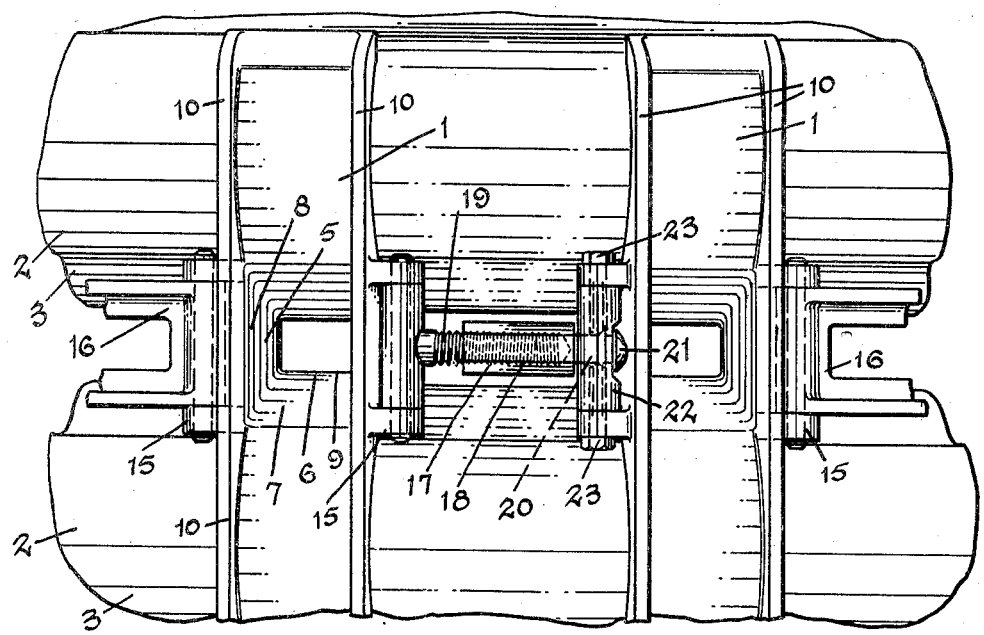
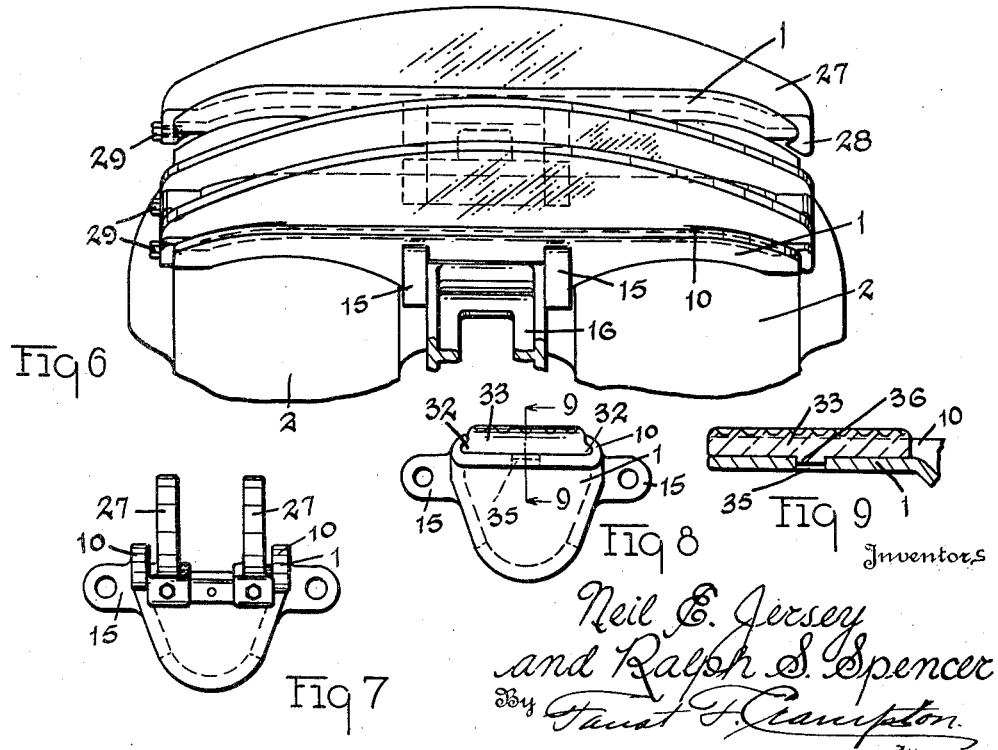

Patented Oct. 23, 1934

1,977,764

UNITED STATES PATENT OFFICE 1,977,764

TRACTION TREAD

Neil E. Jersey, Bucyrus, and Ralph S. Spencer, Massillon, Ohio

Application April 14, 1933, Serial No. 666,180

1 Claim. (Cl. 152—14)

Our invention has for its object to provide an efficient traction tread for pneumatic tired dual wheels of trucks, tractors, and other conveyances.

The invention particularly has for its object to provide a dual wheel traction unit formed of a plurality of interconnected shoes, the shoes being so constructed that when interconnected and connected to dual wheels they will retain their position as against any lateral slippage or side play and will, at the same time, insure efficient traction and reduce sinking in soil. They are also so constructed that they will readily discharge sticky mud or adherable soil and therefore readily clean themselves.

The invention may be contained in tread structures that vary in their details and, to illustrate a practical application of the invention, we have selected a tread and a modification thereof that embody our invention as illustrative of practical applications of the invention. The form of tread selected is shown in the accompanying drawings and described hereinafter.

Fig. 1 illustrates a side view of the dual wheel and end edge views of the shoes connected thereto. Fig. 2 is an edge view of the dual wheels and illustrates the shoes in position on the wheels. Fig. 3 is an enlarged view showing a portion of one of the wheels and sections of three of the shoes taken on a plane located centrally between the wheels. Fig. 4 is a view of a section taken on the plane of the line 4—4 indicated in Fig. 3. Fig. 5 is a top view of the part of the tire and the shoes located thereon that are illustrated in Fig. 3. Fig. 6 illustrates the shoes shown in Figs. 1 to 5 and grouters attached thereto. Fig. 7 is an end view of a shoe having a pair of the grouters shown in Fig. 6 attached thereto. Fig. 8 illustrates an end view of a shoe having means for attaching a pair of rubber tread blocks. Fig. 9 illustrates a view of a section of an end part of the shoe shown in Fig. 8 and taken on the plane of the line 9—9 indicated in Fig. 8.

In the form of construction illustrated in the drawings, a plurality of traction shoes 1 are formed to fit the tread surfaces 2 of the tires 3 of the wheels 4. The wheels 4 are joined together by a common axle in the manner well known in the art and are referred to as dual wheels. Each shoe 1 is provided with a protruding portion 5 that partakes of a form of a section of a four sided pyramid having open ends that extend inwardly towards the common axis of the wheels and is located between the opposed lateral surfaces or sides of the tires of the wheels which operate to maintain the traction parts of the treads transverse the tread surfaces 2 of the tires 3 of the wheels 4 and when the shoes are drawn together they operate to wedge between the tires 3.

The protruding portions 5 have surfaces that substantially fit or correspond to the opposed lateral surfaces of the wheels. Preferably, they are so formed as to allow for the lateral distention of contiguous portions of the tires as the said portions progressively pass through the vertical line between the axis and the ground, that is, as the portions progressively sustain the load carried by each of the wheels. Preferably the protruding portions 5 are provided with aprons 6 that extend inwardly with respect to the axis of the wheels to extend the lateral tire contacting surfaces of the protruding portion of the treads. They form parts of the shoes that will reduce the amount of soil that may work between the contacting surfaces of the shoes and the tires, particularly at points in planes of the common axis of the wheels that extend through the center lines of the treads. By reason of the pyramidal formation of the protruding portions, particularly by reason of the inclination of the sides of the protruding portions, with respect to radial lines extending through the openings of the ends of the protruding portions, the shoes will readily discharge any mud or soil that may be forced into the protruding portions, and the protruding portions will operate to retain the treads in position on the dual wheels to maintain the transversely extending central lines in a direction parallel to the planes of the center lines of the tread surfaces 2 of the tires 3, and in line with the parts that interconnect the treads.

The pyramidal protruding portions are formed by the sides 7 that form the openings 9 and the sides 8. Outward extension of the sides 8 form the ribs or ridges 10. They extend across the tread surfaces 2 of the tires 3 and form traction elements for tractively engaging the surface over which the wheels are driven.

The treads 1 are provided with ears 15 and may be interconnected by means of links 16 that are connected to the ears 15. The links are located between the tread surfaces 2 of the tires 3 and preferably lie close to a cylindrical surface extending substantially tangential to the tread surfaces 2 of the tires. Preferably, an adjustable link 17 is provided for drawing the shoes 1 to the tread surfaces 2 of the wheels.

The link 17 is a telescopic link interconnecting a pair of juxtaposed treads. It is provided with a threaded sleeve 18 and a threaded pin 19. The sleeve 18 has a neck 20 and a head 21 for connecting one end of a threaded sleeve to a cross pin 22. A pair of bolts 23 extend through the ears 15 of one of the shoes 1 and is threaded into the cross pin 22. Preferably, the bolts 23 have a length sufficient to engage at their inner ends the neck of the sleeve 18. When, therefore, it is desired to draw the shoes 1 against the tread surfaces 2 of the tires 3, the bolts 23 may be loosened to release the neck 20 and the sleeve 17 may be rotated to draw the threaded pin 19 into the sleeve to shorten the circumferential length of the traction element of the dual wheels. When the treads 1 have been sufficiently tightened on the wheels 2, the bolts 23 may be screwed into the cross pin 22 to clamp or engage the neck 20 of the sleeve 18 and prevent rotation of the sleeve 18 and consequent loosening of the adjustment in subsequent operations of the dual wheels.

If desired grouters 27 may be connected to the treads 1. The grouters 27 may be provided with hooked ends 28 that may be placed so as to engage end edges of the shoes. The other ends of the grouters are provided with bolts 29 that are threaded into grouters and may be screwed into the ends of the grouters so as to engage the other ends of the treads and thus clamp the grouters 27 to the treads.

As shown in Figs. 8 and 9, the ridges 9 of the treads 1 may be curved inwardly, as at 32, to form engaging ridges to engage rubber tread blocks 33. Preferably, the tread 1 is provided with an opening 35 and the rubber tread block 33 is provided with a lug 36 that fits the opening 35 that aids in securing the rubber tread block in position. Where the tread blocks are used, the vehicle having the shoes may run over any form of paved road without injury thereto.

We claim:

A traction unit for pneumatic tired dual wheels, a plurality of shoes extending over the tread surfaces of the tires and having four walls disposed at substantially right angles to each other as measured on a plane extending at right angles to the axis of the pyramid, the said walls terminating in the opening at the radially inward ends of the wall, two of the said walls opposed to each other and substantially corresponding to the oppositely disposed lateral surfaces of the tires, the remaining two side walls of each of said parts having ears located substantially in line with the radially outer ends of the other of the said two side walls, links fitting between the ears and having widths substantially the same as the greater width of the said pyramidal parts for interconnecting the said shoes, and means for adjusting the traction unit circumferentially with respect to the tread surface of the tires.

NEIL E. JERSEY.
RALPH S. SPENCER.